United States Patent
Fung et al.

(10) Patent No.: US 7,136,239 B2
(45) Date of Patent: Nov. 14, 2006

(54) NRZ PIPELINE SERVO WHILE READING OR WRITING

(75) Inventors: Kendall H Fung, Longmont, CO (US); Hui Su, Longmont, CO (US); Dan J Coonen, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 399 days.

(21) Appl. No.: 10/453,954

(22) Filed: Jun. 4, 2003

(65) Prior Publication Data

US 2004/0057145 A1 Mar. 25, 2004

Related U.S. Application Data

(60) Provisional application No. 60/412,402, filed on Sep. 20, 2002.

(51) Int. Cl.
G11B 20/10 (2006.01)
G11B 5/09 (2006.01)

(52) U.S. Cl. .............................. 360/39; 360/46; 360/48; 360/51

(58) Field of Classification Search ................. 360/46, 360/51; 711/167, 169; 369/47.2–47.22, 369/47.16, 47.24
See application file for complete search history.

(56) References Cited

U.S. PATENT DOCUMENTS

| | | | |
|---|---|---|---|
| 5,130,966 A * | 7/1992 | Yoshio et al. ............ 369/47.16 |
| 5,542,058 A | 7/1996 | Brown, III et al. |
| 5,603,012 A | 2/1997 | Sotheran |
| 5,726,821 A * | 3/1998 | Cloke et al. .................. 360/67 |
| 5,768,561 A | 6/1998 | Wise |
| 5,784,631 A | 7/1998 | Wise |
| 5,796,535 A * | 8/1998 | Tuttle et al. .................. 360/51 |
| 5,805,914 A | 9/1998 | Wise et al. |
| 5,809,270 A | 9/1998 | Robbins |
| 5,835,740 A | 11/1998 | Wise et al. |
| 5,842,033 A | 11/1998 | Wise et al. |
| 5,881,301 A | 3/1999 | Robbins |
| 5,956,519 A | 9/1999 | Wise et al. |
| 5,964,867 A | 10/1999 | Anderson et al. |
| 5,978,592 A | 11/1999 | Wise |
| 5,987,539 A | 11/1999 | Goodrum |
| 6,018,776 A | 1/2000 | Wise et al. |
| 6,035,126 A | 3/2000 | Wise et al. |
| 6,038,380 A | 3/2000 | Wise et al. |
| 6,047,112 A | 4/2000 | Wise et al. |
| 6,067,417 A | 5/2000 | Wise et al. |
| 6,079,009 A | 6/2000 | Wise et al. |

(Continued)

Primary Examiner—Andrea Wellington
Assistant Examiner—Dan I Davidson
(74) Attorney, Agent, or Firm—Shumaker & Sieffert, PA

(57) ABSTRACT

A data storage device exhibiting reduced pad regions includes a read/write channel to convert transduced waveforms from a storage medium into recovered digital information. The recovered digital information is communicated from the read/write channel to a controller. The read/write channel includes an analog stage and a digital stage, which function independently. While the digital stage is engaged in the task of recovering servo data, the analog stage may be engaged in the task of recovering user data. Initially, the controller generates a control signal commanding the read/write channel to read and recover servo data. In the wake of the last unit of servo data having been processed by the analog stage of the read/write channel, the controller commands the read/write channel to read user data from the disc. Therefore, the analog stage of the read/write channel reads user data, while the digital stage finishes processing the servo data.

28 Claims, 5 Drawing Sheets

U.S. PATENT DOCUMENTS

| | | |
|---|---|---|
| 6,112,017 A | 8/2000 | Wise |
| 6,163,814 A * | 12/2000 | Hill .............................. 710/1 |
| 6,240,508 B1 | 5/2001 | Brown, III et al. |
| 6,263,422 B1 | 7/2001 | Wise et al. |
| 6,266,091 B1 | 7/2001 | Saha et al. |
| 6,310,918 B1 | 10/2001 | Saha et al. |
| 6,330,665 B1 | 12/2001 | Wise et al. |
| 6,330,666 B1 | 12/2001 | Wise et al. |
| 6,331,075 B1 | 12/2001 | Amer et al. |
| 6,407,740 B1 | 6/2002 | Chan |
| 6,415,349 B1 * | 7/2002 | Hull et al. .................. 711/100 |
| 6,435,737 B1 | 8/2002 | Wise et al. |

* cited by examiner

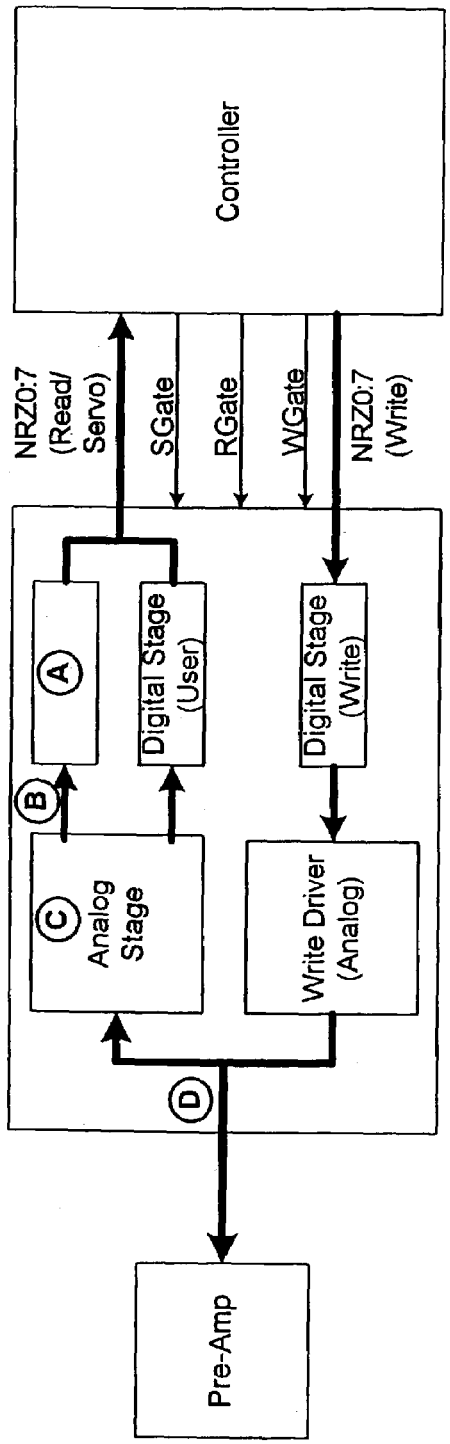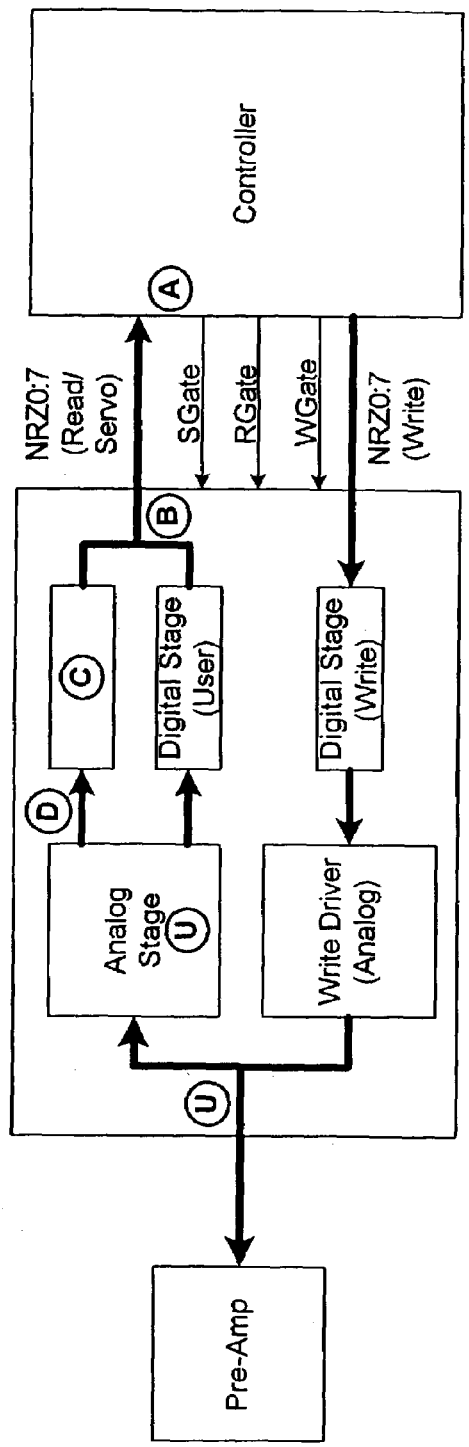
FIG. 5A
FIG. 5B

NRZ PIPELINE SERVO WHILE READING OR WRITING

RELATED APPLICATIONS

This application claims priority of U.S. provisional application Ser. No. 60/412,402, filed Sep. 20, 2002 and entitled "NRZ PIPELINE SERVO WHILE READING OR WRITING."

FIELD OF THE INVENTION

This application relates generally to data storage devices and more particularly to a data storage device that employs pipelining between a first and second stage of input/output circuitry that interfaces to a storage medium.

BACKGROUND OF THE INVENTION

Data storage media, such as magnetically encodable discs in disc drives or optically encodable discs in readable/writable compact disc drives or digital video disc drives, typically contain interspersed regions of servo data and user data. The servo data is typically encoded upon the disc at the time of manufacture, and is used for the purpose of letting the storage mechanism (disc drive, readable/writable CD ROM, etc.) determine the location over which its transducer (read/write head) is located. The regions of user data contain data stored by the user.

Generally, data is read from a storage medium by a read/write channel. The read/write channel receives analog waveforms transduced from the storage medium (a pre-amplifier may be interposed between the transducer and the read/write channel), and converts the analog waveforms into digital form. The digital form may be subsequently processed by a digital stage within the read/write channel. Thereafter, the digital information is communicated to a controller.

Usually, servo data and user data are encoded on the disc in differing formats. Thus, the process of converting an analog servo waveform (a servo burst) into digital data for the controller is different from the process of converting an analog waveform containing user data into digital data for the controller. Because the transformation process varies between servo and user data, a read/write channel functions in only a single mode at any one time. In other words, the read/write channel initially functions in a mode for conversion of servo data. When all of the servo data has been recovered and communicated to the controller, the read/write channel then transitions to a mode in which it recovers user data.

The above-described process exhibits certain shortcomings. For example, there generally exists a latency period from the time an analog waveform is received by the read/write channel to the time the converted information encoded in the waveform is communicated to the controller. Consequently, after all of the servo data has been received by the read/write channel, the read/write channel does not begin reading or writing user data until the latency period has lapsed (i.e., until all of the servo data has been communicated to the controller). Upon lapsing of the latency period, the read/write channel reads/writes user data.

During the latency period, the data storage medium continues to spin. Since no data is read from the medium during the latency period, the latency period corresponds to a literal blank space on the surface of the medium-space in which no data is recorded, because it will not be read. Thus, storage media usually contain a region of servo data, followed by a region of empty space (referred to as a "pad" region) corresponding to the latency period, followed by user data. The aforementioned pad region contains no data whatsoever, and is therefore wasted space.

As is evident from the foregoing, there is a need for a scheme by which the latency period can be diminished. By diminishing the latency period, its corresponding pad region is reduced, and the amount of medium surface devoted to storing user data is increased. Thus, the storage capacity of the medium increases. A successful scheme will be relatively inexpensive and easy to implement.

SUMMARY OF THE INVENTION

Against this backdrop the present invention was developed. According to one embodiment of the invention, a method for efficiently transferring data from a storage medium may be employed in the following setting. It may be employed in a system in which the data storage medium includes interspersed regions of data encoded in a first format and a second format. The system further includes a first stage that reads data from the medium and delivers the data to a second stage that interprets the data. The method includes commanding the first stage to read, from the storage medium, data encoded in the first format. The data encoded in the first format is transferred from the first stage to the second stage. The transference occurs over a first span of time. The first stage is commanded to read, from the storage medium, data encoded in the second format, during the first span of time in which the data is transferred to the second stage.

According to another embodiment of the present invention, a system that efficiently transfers data from a storage medium, may include a read/write channel having an analog stage and a digital stage. The system may also include a controller operably coupled to the digital stage of the read/write channel. The controller may cause the read/write channel to read servo data from the storage medium. Finally, the controller may cause the analog stage of the read/write channel to read/write user data from the storage medium, while the digital stage of the read/write channel is still transferring servo data to the controller.

According to yet another embodiment of the present invention, a system that efficiently transfers data from a storage medium may include a read/write channel and a means for pipelining data recorded in different formats upon the storage medium through the read/write channel.

According to yet another embodiment of the present invention, a storage medium may include a set of data recorded in a first format upon a first region of the medium. The storage medium may also include a set of data recorded in a second format upon a second region of the medium. Finally, the storage medium may include a region of pad space between the first and second regions. The length of the pad space may be less than a latency period of a read/write system associated with the medium.

BRIEF DESCRIPTION OF THE DRAWINGS

FIG. 5A depicts the operation of the architecture of FIG. 4, as the servo bursts are read.

FIG. 5B depicts the architecture of FIG. 4, at a point in time when the final servo burst is no longer being processed by the analog recovery stage.

DETAILED DESCRIPTION OF THE INVENTION

A scheme by which the latency period of a data storage device may be reduced may be realized as follows. The data storage device uses a read/write channel to convert transduced waveforms from a storage medium into recovered digital information. The recovered digital information is communicated from the read/write channel to a controller. The read/write channel includes an analog stage and a digital stage, which function independently of one another. Thus, while the digital stage is engaged in the task of recovering servo data, the analog stage may be engaged in the task of recovering user data. The controller generates control signals to take advantage of the flexibility of the read/write channel.

Initially, the controller generates a control signal commanding the channel to read and recover servo data. In the wake of the last unit of servo data having been processed by the analog stage of the read/write channel, the controller commands the read/write channel to read user data from the disc. Therefore, the analog stage of the read/write channel reads user data, while the digital stage finishes processing the servo data. Such a scheme is referred to as "pipelining." Pipelining is advantageous because it allows the read/write channel to begin the task of reading user data as soon as its analog stage is free of servo data, rather than waiting for the digital stage to be free of servo data, as well. Of course, pipelining is equally applicable to writing, as described herein.

One skilled in the art understands that the invention disclosed herein is applicable to many forms of storage devices. For example, the invention herein may be employed in a disc drive, a digital video disc player, a compact disc (CD) player, a CD ROM, and a readable/writable CD drive, to name a few possible settings. Herein, the invention is described as being employed in a disc drive. Such a description is for illustrative purposes only, and is not intended to limit the scope of the invention.

Figure 1:
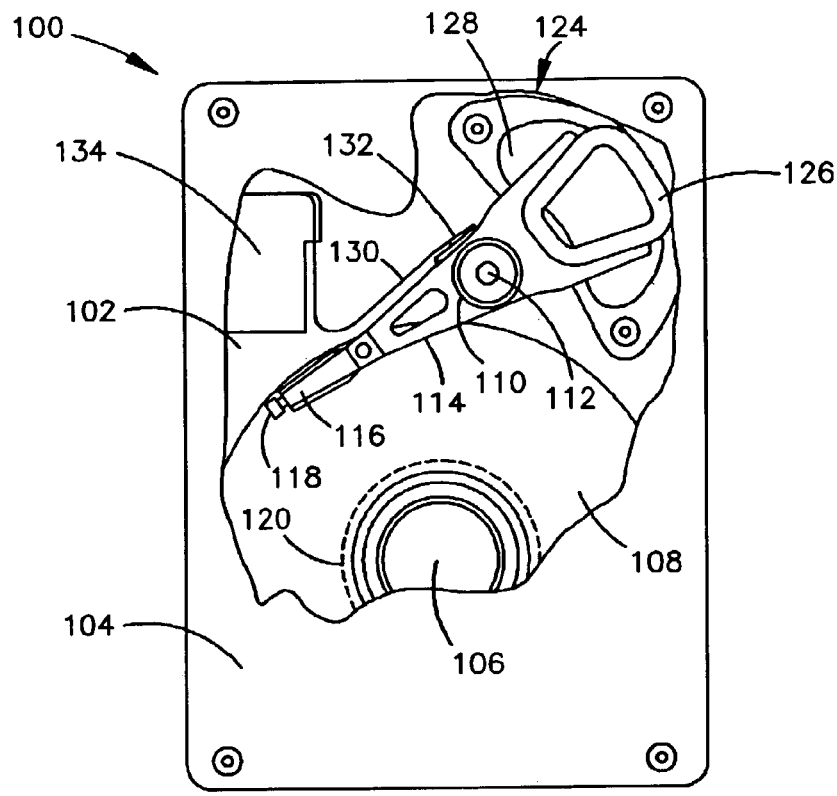
FIG. 1 is a schematic representation of a disc drive in accordance with a preferred embodiment of the invention.
Figure 2:
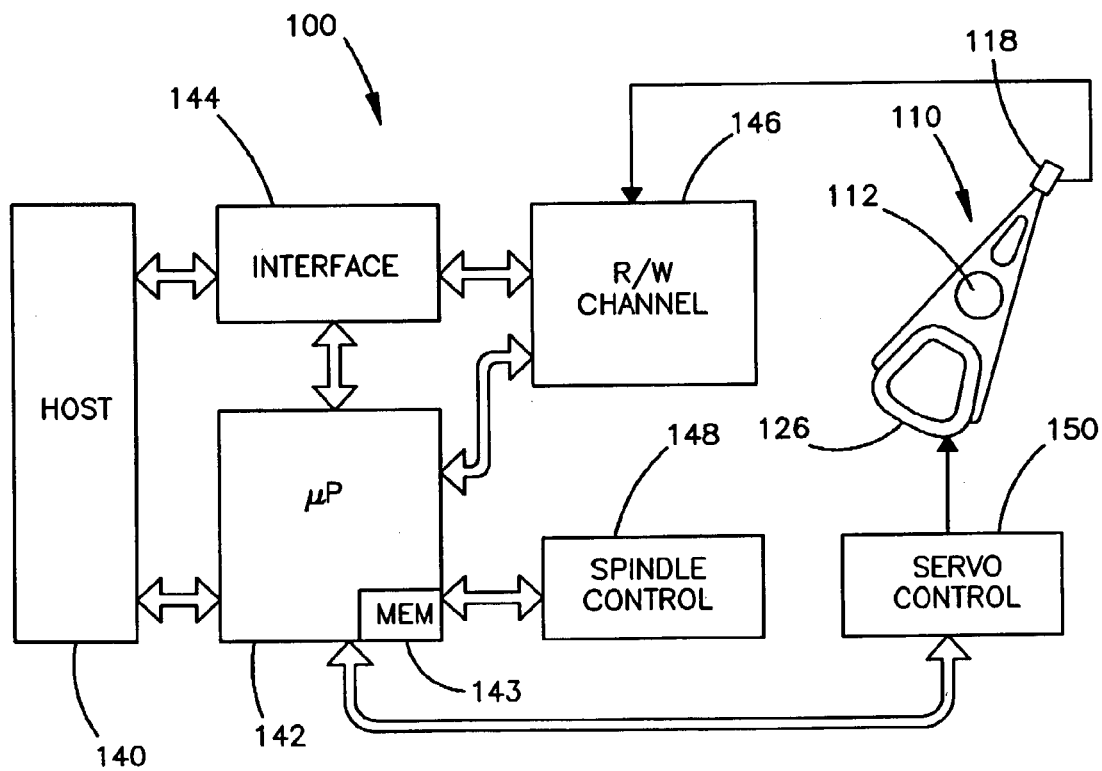
FIG. 2 illustrates a disc drive system connected to a host for the disc drive of FIG. 1.

In the disclosure that follows, the discussion related to FIGS. 1 and 2 is intended to generally present disc technology—one example of a suitable setting for the present invention. The discussion relating to the remaining figures focuses more particularly on the invention, itself.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes a preamplifier with circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, of the plant to generate the response of the servomechanism to a feed-forward control signal.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals through a preamplifier (402 in FIG. 4) to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Figure 3:
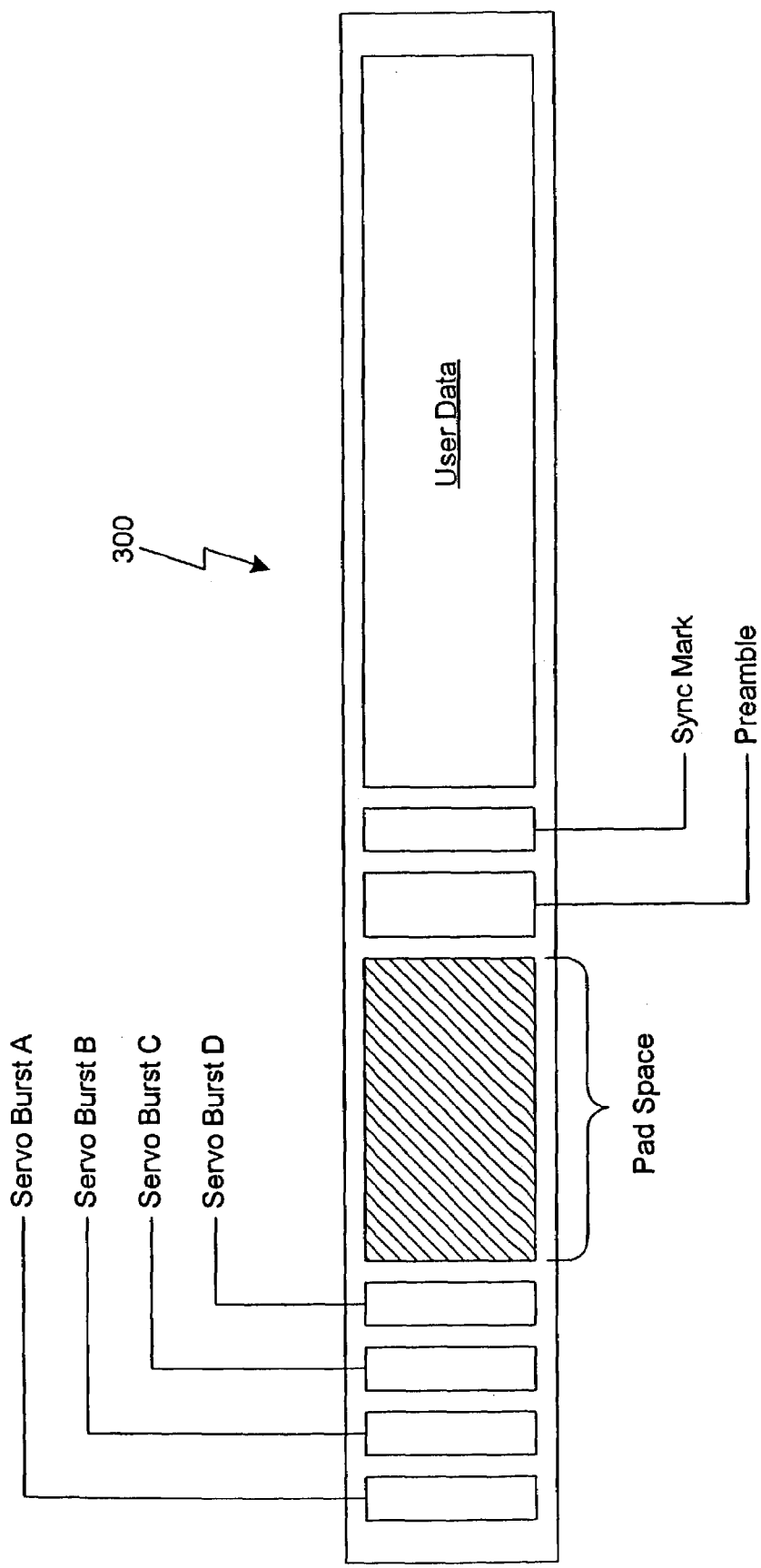
FIG. 3 depicts a linearized representation of a data sector in a disc drive.

FIG. 3 depicts a linearized representation of a portion of a sector 300 in a disc drive. As can be seen from FIG. 3, the depicted portion begins with a series of four servo bursts, which are identified as servo bursts A, B, C, and D. Following the servo bursts is a pad region, which is identified by cross-hatching. As explained previously, the pad region corresponds to the latency period of the read/write channel within the disc drive. Heretofore, the pad region has corresponded to the duration of time required for the last servo burst (servo burst D) to enter the read/write channel, be converted to digital information, and be communicated to the controller. During this period, the read/write channel did not attempt to read user data, because the read/write channel was perceived as "busy" processing digital servo data.

Following the pad space, a preamble (which is used for amplitude and timing synchronization) and a sync mark (used for identifying the beginning of user data) are recorded. Thereafter, a region of user data is recorded.

Although other sector formats are possible, the disclosure describes the invention with relation to the aforementioned servo to data intersector format. One skilled in the art understands that other sector formats exist, and that the precise structure of the sector format is unimportant. The salient features of the aforementioned sector format are that a first region of data (in the case illustrated in FIG. 3, a region of servo bursts) precedes a second region of data (in the case illustrated in FIG. 3, a region including the preamble, sync mark, and user data), and that the first and second regions are encoded in different formats.

Figure 4:
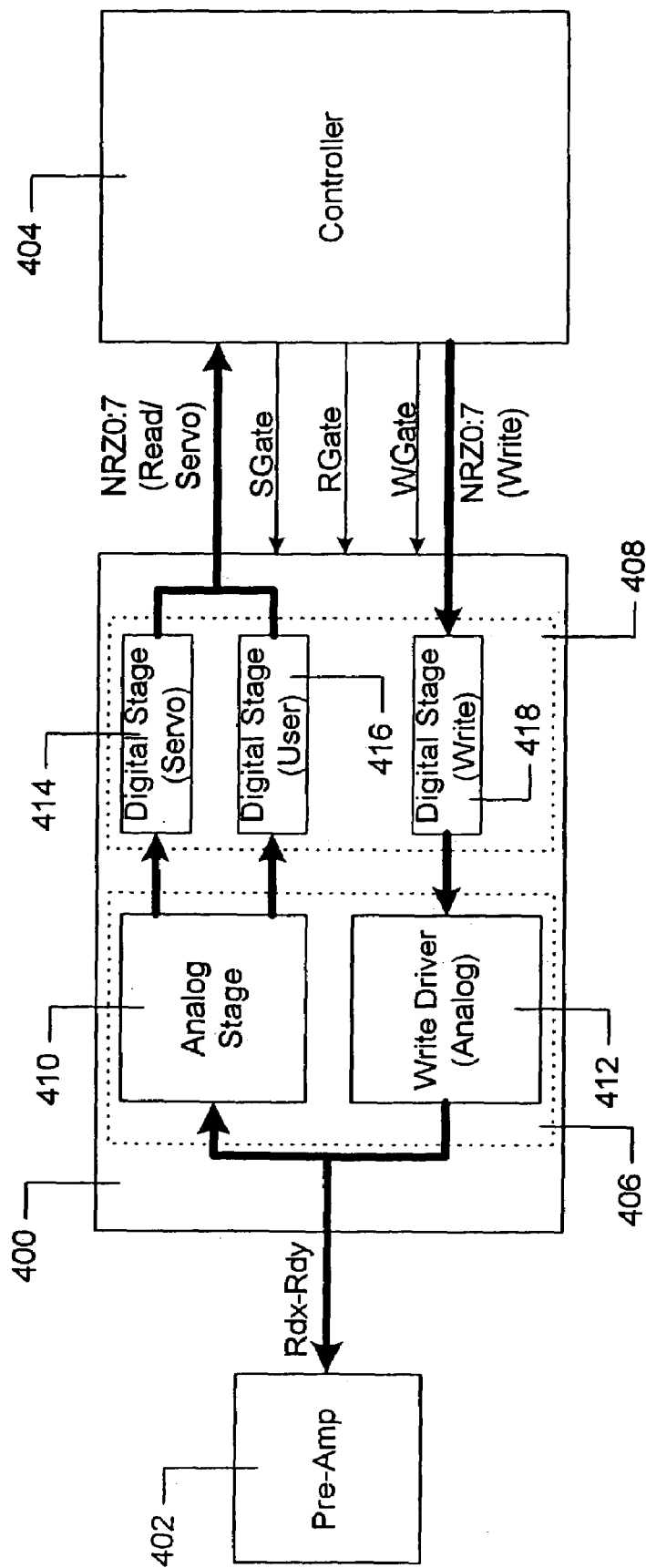
FIG. 4 depicts one example of a hardware architecture that embodies the present invention.

FIG. 4 depicts one example of a hardware architecture that embodies the present invention. As can be seen from FIG. 4, a read/write channel 400 is in communication with a preamplifier 402 and a controller 404. When the disc drive reads data, the preamplifier 402 accomplishes the task of amplifying and otherwise conditioning a transduced signal from the head 118 prior to its delivery to the read/write channel 400. When the disc drive writes data, the preamplifier 402 amplifies and otherwise conditions the analog waveform from the channel 400 prior to its transduction into a magnetic waveform for recordation on the disc. The preamplifier 402 communicates with the read/write channel 400 via a data bus labeled Rdx-Rdy.

Broadly speaking, the read/write channel 400 includes an analog stage 406 and a digital stage 408. The analog stage 406, itself, contains an analog recovery stage 410 and an analog write driver stage 412. When the disc drive reads data from the disc, the back end of the analog recovery stage 410 converts the analog servo or user data into a digital sequence, and communicates the digital sequence to the digital stage 408. The digital stage 408 samples that waveform and converts it to a digital signal. Within the digital stage 408, the samples are processed through a detector. When the disc drive writes data to the disc, the analog write driver stage 412 receives a digital sequence to be written to the disc from the digital stage 408 and converts the sequence into an analog waveform to be recorded to the disc. The analog waveform is subsequently communicated to the preamplifier 402.

The digital stage 408 of the read/write channel 400 contains a digital servo recovery stage 414, a digital user data recovery stage 416, and a digital write data stage 418. When the disc drive reads servo data, the digital servo recovery stage 414 receives a digital sequence from the analog recovery stage 410, and recovers the digital servo information encoded therein. The recovered servo data is then provided to the controller 404 via a data bus labeled NRZ0:7 read/servo.

When the disc drive reads user data, the digital user data recovery stage 416 receives a digital sequence from the analog recovery stage 410, and recovers the digital user data encoded therein. The recovered user data is then provided to the controller 404 via the data bus labeled NRZ0:7 read/servo.

When the disc drive writes user data to the disc, the digital write data stage 418 converts digital user data (received from the controller 404 via the NRZ0:7 write data bus) into a sequence that is equalized by the analog write driver 412.

One of skill in the art understands that the channel 400 and controller 404 may communicate servo, user, and/or write data on a single data bus, or on two data busses (as shown in FIG. 4). In principle, any number of data busses may be used in communication between the controller 404 and the channel 400. The number of data busses is a design choice that does not alter the principles of the invention disclosed herein.

Heretofore, the operation of the architecture depicted in FIG. 4, has been as follows upon reading of a data sector 300 (depicted in FIG. 3). Initially, the preamplifier 402 provides each of the servo bursts A, B, C, and D to the analog recovery stage 410 (servo burst A is first delivered, then servo burst B, then servo burst C, and finally servo burst D is delivered). As the analog recovery stage 410 receives each burst, it converts the analog servo burst into a digital sequence, and communicates the digital sequence to the digital servo recovery stage 414, which recovers the digital servo information encoded therein. Upon recovery of each burst of digital servo data, each burst of digital servo data is communicated to the controller 404.

The above-described process of servo recovery is not instantaneous. Rather, each stage of recovery consumes a given duration of time. Each servo burst consumes a given amount of time in the analog recovery stage 410, and then consumes a given amount of time in the digital servo recovery stage 414. Thus, from the moment the last servo burst (i.e., servo burst D) is communicated from the preamplifier 402 to the read/write channel 400 on the data bus labeled Rdx-Rdy, a known amount of time elapses until the digital servo data contained therein is communicated to the controller 404 via data bus NRZ0:7 read/servo. The known amount of time is known as the latency period, and is approximately equal to the sum of the processing duration of the analog recovery stage 410 and the processing duration of the digital servo recovery stage 414.

As explained previously, heretofore, the read/write channel 400 has not attempted to read user data during the pendency of the latency period. Consequently, the region of disc space immediately following the last servo burst (servo burst D in FIG. 3) is blank, because no data will be read therefrom. If pipelining is not employed, the pad region is equal to or greater than the latency period.

FIGS. 5A and 5B depict the operation of the architecture depicted in FIG. 4 when pipelining is employed. Specifically, FIG. 5A depicts the operation of the architecture of FIG. 4, as the servo bursts (depicted in FIG. 3) are read. Each of the four servo bursts A, B, C, and D are graphically depicted as circles labeled by the letters "A," "B," "C," and "D." As depicted in FIG. 5A, servo burst "A" (the first servo burst to be read) is being processed by the digital servo recovery stage 414. As depicted in FIG. 5A, the subsequent servo bursts are in various previous stages of processing. Servo burst B is being transferred from the analog recovery stage 410 to the digital servo recovery stage 414. Servo burst C is being equalized by the analog recovery stage 410, and servo burst D is being transferred to the analog recovery stage 410 via data bus Rdx-Rdy. In short, the entire read/write channel 400 is occupied processing servo bursts.

FIG. 5B depicts the architecture of FIG. 4, at a point in time when the final servo burst (servo burst D) is no longer being processed by the analog recovery stage 410. As depicted in FIG. 5B, servo burst D is being communicated to the digital servo recovery stage 414, and the previous servo bursts A, B, and C are in subsequent stages of processing. Notably, a first unit of user data (depicted as a circle labeled with a "U") is being equalized by the analog recovery stage 410. Meanwhile, the next unit of user data is being transferred to the analog recovery stage via data bus Rdx-Rdy. Thus, the analog stage 406 of the read/write channel 400 is processing user data, while the digital stage 408 is processing servo data. As a consequence of this pipelined approach, the pad region depicted in FIG. 3 may be made to be less than the latency period of the read/write channel 400. In fact, the pad region may be shrunk to be equal in length to the processing duration of the analog recovery stage 410.

Broadly stated, FIGS. 5A and 5B present the following principle. The read/write channel is divided into N stages, each of which operates independently (in the particular architecture of FIGS. 5A and 5B, N=2). Instead of waiting for the last servo burst to migrate its way through each of the N stages before reading the first unit of user data, the read/write channel waits only until the last servo burst is finished being processed by the first stage. Thus, the effective latency period is equal to only the processing duration of the first stage of the read/write channel, rather than being equal to the sum of the processing durations of all N stages.

Figure 6A:
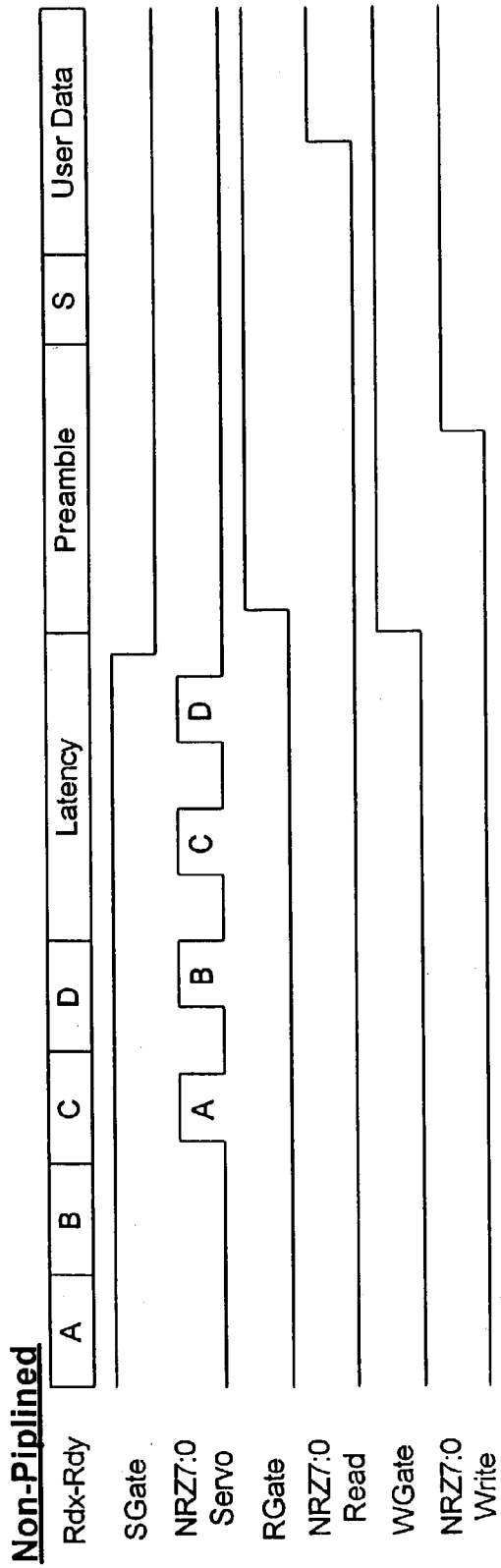
FIG. 6A depicts a timing diagram of control signals for the system of FIG. 4, wherein pipelining is not employed.
Figure 6B:
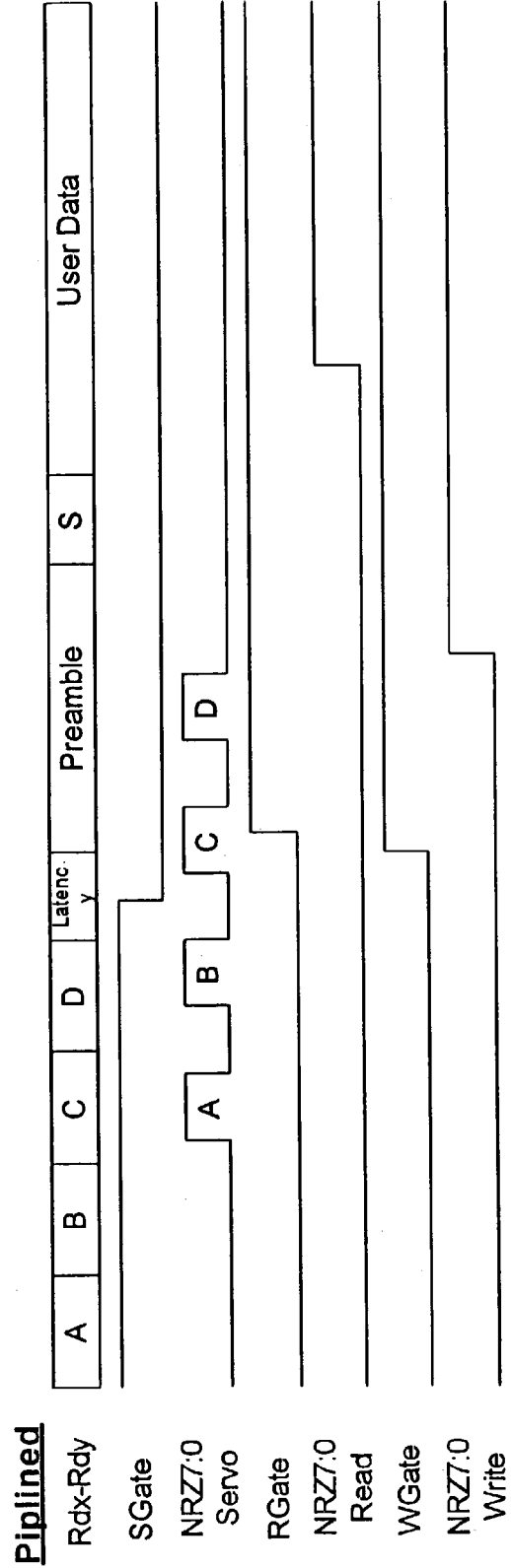
FIG. 6B depicts a timing diagram of control signals for the architecture of FIG. 4, wherein pipelining is employed.

FIGS. 6A and 6B depict signal timing diagrams for one exemplary embodiment of control signals causing the read/write channel 400 to behave as described above. FIG. 6A depicts a timing diagram of control signals for the system of FIG. 4, wherein pipelining is not employed. As can be seen from FIG. 6A, the contents of data busses Rdx-Rdy, NRZ7:0 (read/servo), and NRZ7:0 (write) are depicted versus time (on the x axis). Data bus NRZ7:0 (read/servo) is depicted two times—a first time to depict its contents with respect to servo data (NRZ7:0 Servo) and a second time to depict its contents with respect to user data read from the disc (NRZ7:0 Read). Per the architecture of FIG. 4, these signals are carried on the same data bus. FIG. 6A depicts data bus NRZ7:0 (read/servo) as broken into two separate lines for the sake of illustration only.

Also depicted in FIG. 6A are three separate control signals: (1) SGate; (2) RGate; and (3) WGate. SGate, RGate and WGate are each generated by the controller 404 and communicated to the read/write channel 400, as depicted in FIG. 4.

The assertion of SGate (depicted as asserting high) causes two events to occur: (1) the read/write channel 400 reads servo data from the disc while this signal is asserted; and (2) the controller 404 looks to the data bus NRZ7:0 (read/servo) for servo data while this signal is asserted.

Similarly, the assertion of RGate (depicted as asserting high) causes two events to occur: (1) the read/write channel 400 reads user data from the disc while this signal is asserted; and (2) the controller 404 looks to the data bus NRZ7:0 (read/servo) for user data read from the disc while this signal is asserted.

Finally, the assertion of WGate (depicted as asserting high) causes two events to occur: (1) the read/write channel 400 looks for user data on the data bus NRZ7:0 (write), and converts the data to an analog waveform for recordation on the disc; and (2) the controller 404 puts user data to be recorded on the disc on to the data bus NRZ7:0 (write).

As depicted in FIG. 6A, when the disc drive initially reads the data sector 300 (depicted in FIG. 3), data bus Rdx-Rdy carries servo burst A, followed by servo bursts B, C, and D. Notably, these servo bursts do not appear on data bus NRZ7:0 (servo) until the latency period has elapsed (i.e., until servo burst A has been processed by both the analog and digital stages of the read/write channel 400 and has been put on the data bus NRZ7:0 for communication to the controller 404). Thus, NRZ7:0 (servo) depicts servo burst A shifted to the right (i.e., delayed in time) relative to servo burst A as depicted in analog bus Rdx-Rdy. Similarly, servo bursts B, C, and D are also shifted to the right (i.e., delayed in time) relative to servo bursts B, C, and D on analog bus Rdx-Rdy.

During the period that servo bursts A, B, C, and D are carried on analog bus Rdx-Rdy, SGate is asserted. As described above, when SGate is asserted, the read/write channel 400 reads servo data, and the controller 404 looks for servo data on NRZ7:0. Consequently, SGate remains asserted for as long as it is appropriate for the controller 404 to be looking at data bus NRZ7:0 for servo data—SGate remains asserted until the final servo burst has been placed upon data bus NRZ7:0, at which time the control line is de-asserted.

Shortly after the de-assertion of SGate, RGate is asserted, meaning that the read/write channel 400 begins to read user data from the disc. Immediately upon the assertion of RGate, the disc drive begins to read the preamble, as shown by Rdx-Rdy. Hence, per the non-pipelining embodiment, the read/write channel 400 does not begin to read user data until the final servo burst (servo burst D) has been delivered from the read/write channel 400 to the controller 404 on NRZ7:0 (read/servo). Importantly, one can see that the latency period carried on Rdx-Rdy corresponds to the time between the arrival of servo burst D and when that information is transferred on NRZ7:0 (read/servo). Sometimes there is a two byte waiting period after the arrival of servo burst D on NRZ7:0 (read/servo) and the assertion of RGate. This gives time for the controller sequencer to switch from reading servo to reading user data. One should also note that the sync mark (S) does not appear on data bus NRZ7:0 (read/servo) until the latency period has elapsed (i.e., until the preamble and sync mark have been processed by both the analog and digital stages of the read/write channel 400, and the sync mark has been put on the data bus NRZ7:0 (read/servo) for communication to the controller 404). Thus, NRZ7:0 (read) depicts the sync mark followed by the first unit of user data appearing thereon (depicted generically by assertion of "NRZ7:0 Read") at a point in time shifted to the right (i.e., delayed in time) relative to the assertion of RGate. This is a second latency period that corresponds to the time between arrival of the sync mark on data bus Rdx-Rdy and when that sync mark is transferred on th NRZ7:0 (read/servo) bus.

If instead of reading data to the data sector 300, the disc drive is to write data thereto, one can see that WGate asserts a short time after the servo data is off of data bus NRZ7:0 (read/servo). User data to be written to the disc begins being transferred to the read/write channel 400 shortly thereafter, as shown by the assertion of NRZ7:0 (write). Notably, there exists a latency period between the time at which user data is delivered to the read/write channel for writing to the disc and the time at which user data is actually recorded to the disc (identified by "User Data" carried on "Rdy—Rdy").

FIG. 6B depicts the signal timing on the control lines of the architecture of FIG. 4, when they have been modified to implement pipelining, as described above.

As was the case with FIG. 6A, when the disc drive initially reads the data sector 300 (depicted in FIG. 3), data bus Rdx-Rdy carries servo burst A, followed by servo bursts B, C, and D. The servo bursts do not appear on data bus NRZ7:0 (read/servo) until the latency period has elapsed (i.e., until servo burst A has been processed by both the analog and digital stages of the read/write channel 400 and has been put on the data bus NRZ7:0 for communication to the controller 404). Thus, NRZ7:0 (servo) depicts servo burst A shifted to the right (i.e., delayed in time) relative to servo burst A as depicted in data bus Rdx-Rdy. Similarly, servo bursts B, C, and D are also shifted to the right (i.e., delayed in time) relative to servo bursts B, C, and D on data bust Rdx-Rdy.

Importantly, SGate is now controlled to de-assert shortly after the final servo burst (servo burst D) has been placed on data bus Rdx-Rdy. This is possible for two reasons. First, the read/write channel 400 has already read the final servo burst into the analog stage 410, so it no longer needs SGate asserted to instruct it to read servo bursts. Second, the controller 404 is designed to look for an additional two servo bursts after having de-asserted SGate. The re-design may involve the addition of another control line. The added control line asserts after expiration of a time calculated for two servo bursts to have arrived on data bus NRZ7:0 (read/servo). Prior to assertion of the added control line, the controller 404 interprets the data on NRZ7:0 (read/servo) as servo data; after de-assertion of the added control line, the controller interprets data on NRZ7:0 (read/servo) as user data. Thus, although SGate is de-asserted, the controller 404 continues to seek two additional servo bursts (and therefore correctly interprets servo bursts C and D). One should note that in the embodiment depicted in FIG. 6B, SGate de-asserts well ahead of the time at which SGate de-asserts in FIG. 6A.

Shortly after SGate de-asserts, RGate asserts, meaning that the read/write channel 400 begins to read the preamble while it is still sending servo bursts to the controller 404. This is one example of "pipelining." Thus, the latency period (which corresponds to the time between the arrival of the last burst on data bus Rdx-Rdy and the assertion of RGate) is reduced vis-à-vis FIG. 6A.

If instead of reading data to the data sector 300, the disc drive is to write data thereto, one can see that WGate asserts in advance of servo data being clear of data bus NRZ7:0 (read/servo). The assertion of WGate is timed so that user data to be written to the disc reaches data bus NRZ7:0 (write) shortly after the last servo burst (servo burst D) has cleared NRZ7:0 (read/servo). One should note that WGate asserts at a point in time in advance of that at which it asserts per the embodiment of FIG. 6A. Thus, there is shorter latency, less wasted space between servo and data, so data is written to the disc sooner per the embodiment of FIG. 6B. This leaves more space at the end of data. The gains can be exploited two ways: (1) more data may be written to the disc, resulting in increased storage capacity of the disc; or (2) the linear density of data on the disc may be decreased, thereby improving the error rate of the disc drive.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, although the disclosure has been directed toward reducing a pad region interposed between servo data and user data, the invention may be employed to reduce a pad region interposed between any two regions of data encoded in different formats. Additionally, although the disclosure depicts an embodiment wherein user data to be written to the disc and user data read from the disc are communicated between the read/write channel and the controller via the same data bus, this need not be the case. A separate data bus may be provided for each purpose (one for read data, one for write data). Per such an embodiment, WGate asserts shortly after de-assertion of SGate, instead of delaying such assertion for the purpose of avoiding a data collision of NRZ7:0. Furthermore, as discussed previously, although the invention has been described with reference to a disc drive, the invention may be employed in a digital video disc player, a compact disc (CD) player, a CD ROM, and a readable/writable CD drive, to name a few possible settings. Numerous other changes may be made which will readily suggest themselves to those skilled in the art and which are encompassed in the invention disclosed and as defined in the appended claims.

The claimed invention is:

1. A method comprising:
commanding a first stage to read, from a storage medium, data encoded in a first format;
transferring the data encoded in the first format from the first stage to a second stage, the transference occurring over a first span of time; and
commanding the first stage to read, from the storage medium, data encoded in the second format, during the first span of time in which the data is transferred to the second stage.

2. The method of claim 1, further comprising:
commanding the second stage to interpret the data received from the first stage per the first data encoding format, during the first span of time.

3. The method of claim 1, further comprising:
transferring the data encoded in the second format from the first stage to the second stage, the transference occurring over a second span of time that is subsequent to the first span of time.

4. The method of claim 3, further comprising:
commanding the second stage to interpret the data received from the first stage per the second data encoding format, during the second span of time.

5. The method of claim 1, further comprising:
transferring from the second stage to the first stage, data to be recorded to the storage medium in the second format, the transference occurring after completion of the first span of time.

6. The method of claim 1, wherein the data encoded in the first encoding format comprises servo data.

7. The method of claim 1, wherein the data encoded in the second encoding format comprises user data.

8. The method of claim 1, wherein the first stage comprises a read/write channel.

9. The method of claim 1, wherein the second stage comprises a controller.

10. A system comprising:
a read/write channel having an analog stage and a digital stage;
a controller operably coupled to the digital stage of the read/write channel;
wherein, the controller
causes the read/write channel to read servo data from storage medium; and
causes the analog stage of the read/write channel to read user data from a storage medium, while the digital stage of the read/write channel is still transferring servo data to the controller.

11. The system of claim 10, wherein:
the controller transfers user data to the read/write channel after the read/write channel has completed transferring servo data to the controller; and
the read/write channel causes the user data received from the controller to be written to the storage medium.

12. The system of claim 10, wherein the storage medium is a magnetically encodable disc.

13. The system of claim 10, wherein the storage medium is an optically encodable disc.

14. The system of claim 10, wherein the digital stage of the read/write channel comprises:
a digital stage for processing of servo data;
a digital stage for processing of user data read from the storage medium; and
a digital stage for processing of user data to be written to the storage medium.

15. The system of claim 10, wherein data read from the storage medium and data to be written to the storage medium is communicated between the read/write channel and the controller via a single data bus.

16. The system of claim 10, wherein:
data read from the storage medium is communicated from the read/write channel to the controller via a first data bus; and
data to be written to the storage medium is communicated from the controller to the read/write channel via a second data bus.

17. The system of claim 16, wherein the controller transfers user data to be recorded on the storage medium to the digital stage of the read/write channel upon the analog stage having completed processing of servo data.

18. A system comprising a read/write channel; and
means for pipelining data recorded in different formats upon a storage medium through the read/write channel.

19. The system of claim 18, wherein:
the means for pipelining comprises a means for causing the read/write channel to read user data from the storage medium, while the read/write channel is still transferring servo data to a controller.

20. The system of claim 18, wherein:
the means for pipelining comprises a means for transferring user data to the read/write channel after the read/write channel has completed transferring servo data to a controller.

21. The system of claim 18, wherein the storage medium comprises a magnetically encodable disc.

22. The system of claim 18, wherein the storage medium comprises an optically encodable disc.

23. A storage medium comprising:
a set of data recorded in a first format upon a first region of the medium;
a set of data recorded in a second format upon a second region of the medium; and
a region of pad space between the first and second regions, wherein the length of the pad space is less than the length of pad space corresponding to a latency period of a read/write system associated with the medium.

24. The data storage medium of claim 23, wherein:
the set of data recorded in the first format comprises servo data.

25. The data storage medium of claim 23, wherein:
the set of data recorded in the second format comprises user data.

26. The data storage medium of claim 23, wherein the read/write system associated with the medium comprises a digital video disc player.

27. The data storage medium of claim 23, wherein the read/write system associated with the medium comprises a compact disc player.

28. The data storage medium of claim 23, wherein the read/write system associated with the medium comprises a disc drive.

* * * * *